United States Patent
Karadi et al.

(10) Patent No.: US 11,811,317 B2
(45) Date of Patent: Nov. 7, 2023

(54) CONTROLLER FOR A POWER SUPPLY AND A POWER SUPPLY

(71) Applicant: NXP B.V., Eindhoven (NL)

(72) Inventors: Ravichandra Karadi, Eindhoven (NL); Matthias Rose, Helmond (NL); Hendrik Johannes Bergveld, Eindhoven (NL); Marcel Dijkstra, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/303,129

(22) Filed: May 20, 2021

(65) Prior Publication Data

US 2021/0384826 A1 Dec. 9, 2021

(30) Foreign Application Priority Data

Jun. 5, 2020 (EP) .................................... 20178511

(51) Int. Cl.
*H02M 3/157* (2006.01)
*H02M 1/00* (2006.01)

(52) U.S. Cl.
CPC ......... *H02M 3/157* (2013.01); *H02M 1/0025* (2021.05)

(58) Field of Classification Search
CPC .......................................... H02M 3/155–1588
See application file for complete search history.

(56) References Cited

U.S. PATENT DOCUMENTS

| 6,215,288 | B1 | 4/2001 | Ramsey et al. |
| 6,366,070 | B1 | 4/2002 | Cooke et al. |
| 8,760,141 | B2 | 6/2014 | Man et al. |
| 9,312,765 | B2 | 4/2016 | Walsh et al. |
| 2007/0170902 | A1 | 7/2007 | Chen et al. |
| 2008/0224678 | A1* | 9/2008 | Tobin ................... H02M 3/1584 323/283 |
| 2009/0174440 | A1 | 7/2009 | Man et al. |
| 2009/0289612 | A1* | 11/2009 | Hojo ..................... H02M 3/156 323/290 |
| 2018/0123440 | A1 | 5/2018 | Lee et al. |
| 2018/0337601 | A1 | 11/2018 | Vadnerkar et al. |

* cited by examiner

*Primary Examiner* — Peter M Novak (57) ABSTRACT

A controller for controlling a DC-DC converter in a discontinuous conduction mode (DCM) includes an output module configured to provide a switch control signal to the DC-DC converter having an on-time and a switching frequency. The controller includes an on-time-control-module configured to receive a first compensation signal based on the output voltage of the DC-DC converter; and set the on-time of the switch control signal based on the first compensation signal. The controller also includes a frequency-control-module configured to receive a second compensation signal, wherein the second compensation signal is based on the output voltage of the DC-DC converter, and regulate the second compensation signal to a target range by setting the switching frequency of the switch control signal to one of a plurality of pre-defined discrete switching frequencies.

18 Claims, 7 Drawing Sheets

CONTROLLER FOR A POWER SUPPLY AND A POWER SUPPLY

CROSS-REFERENCE TO RELATED APPLICATIONS

This application claims the priority under 35 U.S.C. § 119 of European Patent application no. 20178511.0, filed on 5 Jun. 2020, the contents of which are incorporated by reference herein.

FIELD

The present disclosure relates to the field of DC-DC controllers. In particular, the present disclosure relates to a controller for controlling a DC-DC converter in a discontinuous conduction mode and a DC-DC converter for use with noise-sensitive loads.

SUMMARY

According to a first aspect of the present disclosure there is provided a controller for controlling a DC-DC converter in a discontinuous conduction mode, DCM, the controller comprising;
an output module configured to provide a switch control signal to the DC-DC converter, the switch control signal having an on-time and a switching frequency,
an on-time-control-module configured to:
  receive a first compensation signal, wherein the first compensation signal is based on the output voltage of the DC-DC converter; and
  set the on-time of the switch control signal based on the first compensation signal; and
a frequency-control-module configured to:
  receive a second compensation signal, wherein the second compensation signal is based on the output voltage of the DC-DC converter; and
  regulate the second compensation signal to a target range by setting the switching frequency of the switch control signal to one of a plurality of pre-defined discrete switching frequencies.

The controller can advantageously combine a continuous on-time control with a frequency-hopping control. By frequency hopping between the discrete switching frequencies, the controller can provide a predictable output voltage spectrum. By restricting the on-time to a target range (by regulating the compensation signal to the target range), the efficiency of the controller can remain high for a wide range of load currents.

In one or more embodiments the first compensation signal and the second compensation signal may comprise:
  separate signals; or
  a same compensation signal.

In one or more embodiments the plurality of pre-defined discrete switching frequencies may comprise:
  a fundamental frequency; and
  one or more frequencies that are integer multiples of the fundamental frequency.

In one or more embodiments the frequency-control-module may be configured to regulate the second compensation signal by:
  increasing the switching frequency if the second compensation signal is greater than an upper limit of the target range; and
  decreasing the switching frequency if the second compensation signal is less than a lower limit of the target range.

In one or more embodiments the frequency-control-module may be configured to increment or decrement the switching frequency to an adjacent one of the plurality of pre-defined discrete switching frequencies if the second compensation signal is outside the target range.

In one or more embodiments the frequency-control-module may be configured to:
  determine a deviation of the second compensation signal from the target range; and
  set the switching frequency to one of the plurality of pre-defined discrete switching frequencies based on the deviation.

In one or more embodiments the first compensation signal and the second compensation signal may be based on a comparison of the output voltage of the DC-DC converter to a reference voltage.

In one or more embodiments the controller may further comprise an error module configured to provide the first compensation signal and the second compensation signal. The error module may be a $g_m$ stage error amplifier.

In one or more embodiments the frequency-control-module may be configured to:
  receive a plurality of clock signals, each clock signal having a frequency equal to one of the plurality of pre-defined discrete switching frequencies; and
  set the switching frequency of the switch control signal to one of the plurality of pre-defined discrete switching frequencies by outputting the corresponding clock signal.

In one or more embodiments the controller may comprise a plurality of reference clocks configured to provide the plurality of clock signals.

In one or more embodiments the controller may further comprise a reference clock and a plurality of frequency dividers configured to provide the plurality of clock signals.

In one or more embodiments the frequency-control-module may be configured to compare the second compensation signal to the target range at an edge of a reference clock signal.

In one or more embodiments the reference clock signal may correspond to the lowest switching frequency of the plurality of predefined discrete switching frequencies.

In one or more embodiments the controller may be configured to regulate the output voltage of the DC-DC converter to the reference voltage.

In one or more embodiments the on-time-control module may comprise a ramp generator. The on-time-control module may be configured to:
  compare a ramp voltage from the ramp generator to the first compensation signal; and
  set the on-time of the switch control signal based on the comparison.

In one or more embodiments the on-time-control module may be configured to:
  compare a current of the DC-DC converter to the first compensation voltage; and
  set the on-time of the switch control signal based on the comparison.

In one or more embodiments the controller may be configured to operate in a pulse-frequency modulation mode if the second-compensation-signal is less than a lower limit of the target range and the switching frequency of the switch control signal is equal to the lowest switching frequency of the plurality of pre-defined discrete switching frequencies.

In one or more embodiments the controller may be configured to operate a DC-DC converter in discontinuous conduction mode.

According to a second aspect of the disclosure there is provided a DC-DC converter comprising any of the controllers described herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

It is becoming increasingly important for switched-mode DC-DC converters to control the output voltage and input current spectrum. The main reason is that such converters are more commonly used to supply noise-sensitive loads such as Bluetooth or NFC transceivers. These transceivers are usually sensitive only to noise/disturbance in a certain frequency range, i.e. the frequency range applicable to the signals they process. The control architecture of the DC-DC converter needs to ensure by design that switching harmonics are predominantly generated outside of the sensitive frequency band of the load or inside that band at a fixed location, such that specific filtering means can be applied to filter these harmonics out.

Low-power switched-mode DC-DC converters often operate in discontinuous conduction mode (DCM). In DCM operation, the inductor current returns to zero between switching cycles. DCM operation is a trend that is driven by miniaturization. The size of inductors in low-power DC-DC converters is decreasing (or even package-integrated) leading to smaller inductance values. Smaller inductance values lead to larger inductor current differences (or deltas) for a given switching frequency. Hence continuous conduction mode (CCM) can only be sustained for heavy loads at very high switching frequencies (to reduce current ripple), leading to lower efficiency.

A low-power DC-DC converter operating in DCM can be controlled with a pulse-frequency-modulation (PFM) controller or a pulse-width-modulation (PWM) controller.

Figure 1A:
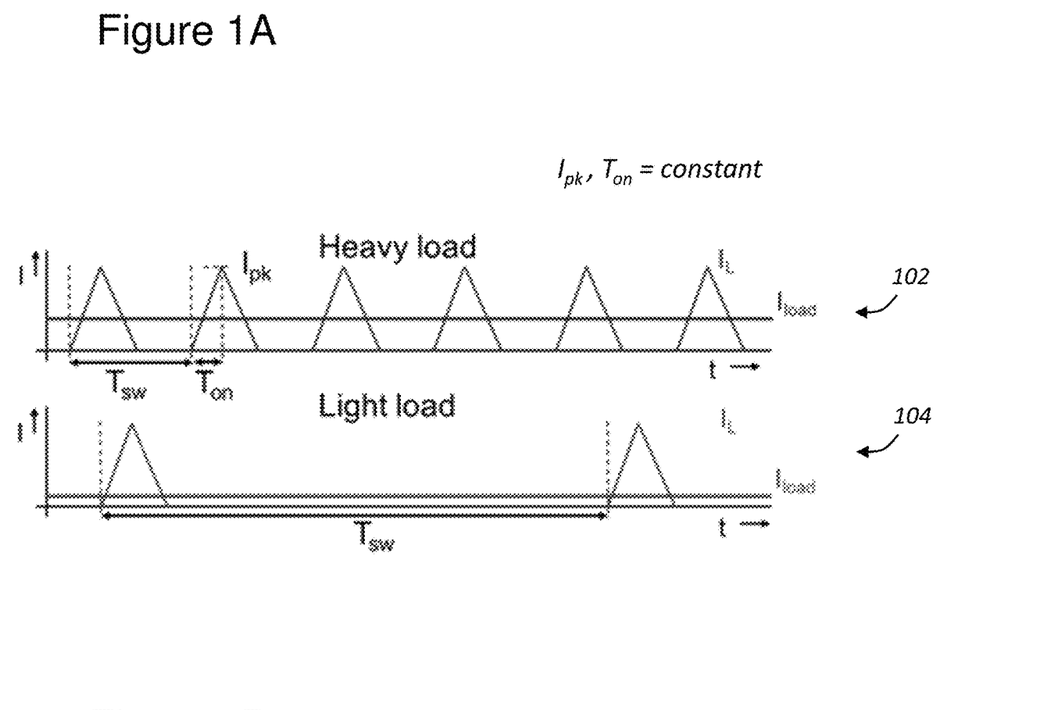
FIG. 1A illustrates the operating principle of a PFM controller operating a DC-DC converter in discontinuous conduction mode, DCM.

FIG. 1A illustrates the operating principle of a PFM controller operating a DC-DC converter in DCM. A current, $I_L$, in the inductor of the DC-DC converter is shown plotted against time. A first PFM plot 102 depicting PFM mode shows the inductor current for a heavy load at the output of the DC-DC converter. A second PFM plot 104 depicting PFM mode shows the inductor current for a light load coupled to the output of the DC-DC converter. The load current, $I_{load}$, is also illustrated for both the heavy load and the light load. The PFM controller operates at a lower frequency with longer switching period, $T_{sw}$, for the light load relative to the heavy load to meet the load current requirement. A peak inductor current, $I_{pk}$, (or equivalently an on-time, $T_{on}$, of a power switch of the DC-DC converter, during which the current through this power switch as well as the inductor rises to the peak current value $I_{pk}$) is kept constant irrespective of the load current, $I_{load}$. Instead the pulse frequency changes with the load.

An advantage of a PFM controller is that the efficiency can be high over a wide load range, because the switching and conduction losses scale with the load current. A disadvantage of a PFM controller is that the switching frequency can vary over a wide range, for example from kHz to MHz, because the switching frequency is dependent on the load current. This can make PFM controllers unsuitable for noise-sensitive loads as the switching frequency might coincide with a sensitive frequency range of the load.

Figure 1B:
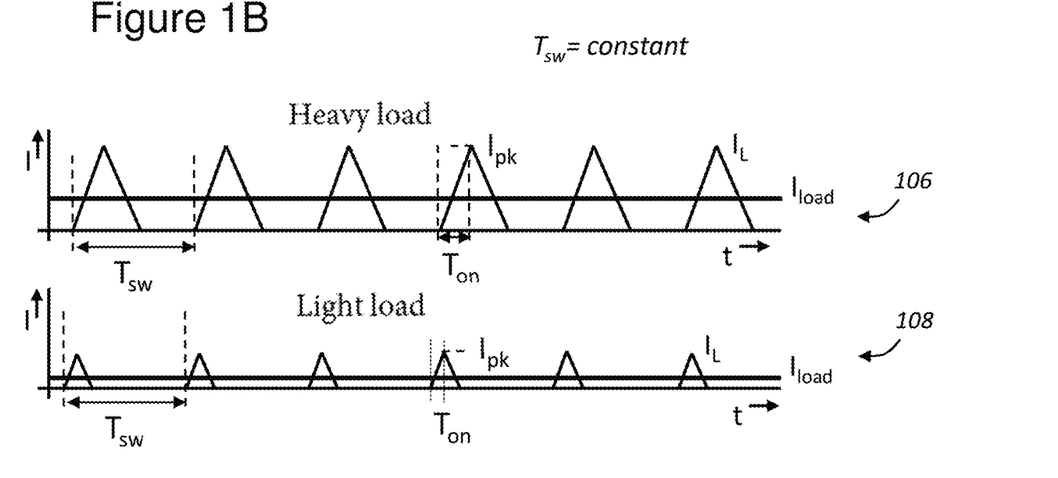
FIG. 1B illustrates the operating principle of a PWM controller operating a DC-DC converter in DCM.

FIG. 1B illustrates the operating principle of a PWM controller operating a DC-DC converter in DCM. First and second PWM plots 106, 108 show inductor current, $I_L$, and load current, $I_{load}$, for a heavy load and a light load, respectively. The PWM controller operates with a fixed switching frequency (so switching period $T_{sw}$ is constant) that remains constant irrespective of the load current, $I_{load}$. The PWM controller regulates the output voltage of the DC-DC converter by changing the duty cycle (pulse width) and therefore the inductor peak current. The on-time, $T_{on}$, of the power switch of the DC-DC converter and the inductor peak current, $I_{pk}$, increase with the load while the switching frequency remains constant.

The peak inductor current, $I_{pk}$, depends on the load current, $I_{load}$, input voltage, $V_{in}$, output voltage, $V_{out}$, switching-frequency, $f_{sw}$, and inductor value, L. For the ideal case of a 100% efficient PWM DC-DC converter the peak inductor current, $I_{pk}$, is described by the following equation:

$$I_{pk} = \sqrt{\frac{2V_{out}(V_{in} - V_{out})}{LV_{in}} \frac{I_{load}}{f_{sw}}}$$

The on-time, $T_{on}$, is directly proportional to the peak current, $I_{pk}$, according to the following equation:

$$T_{on} = \frac{L}{V_{in} - V_{out}} I_{pk}$$

Figure 2:
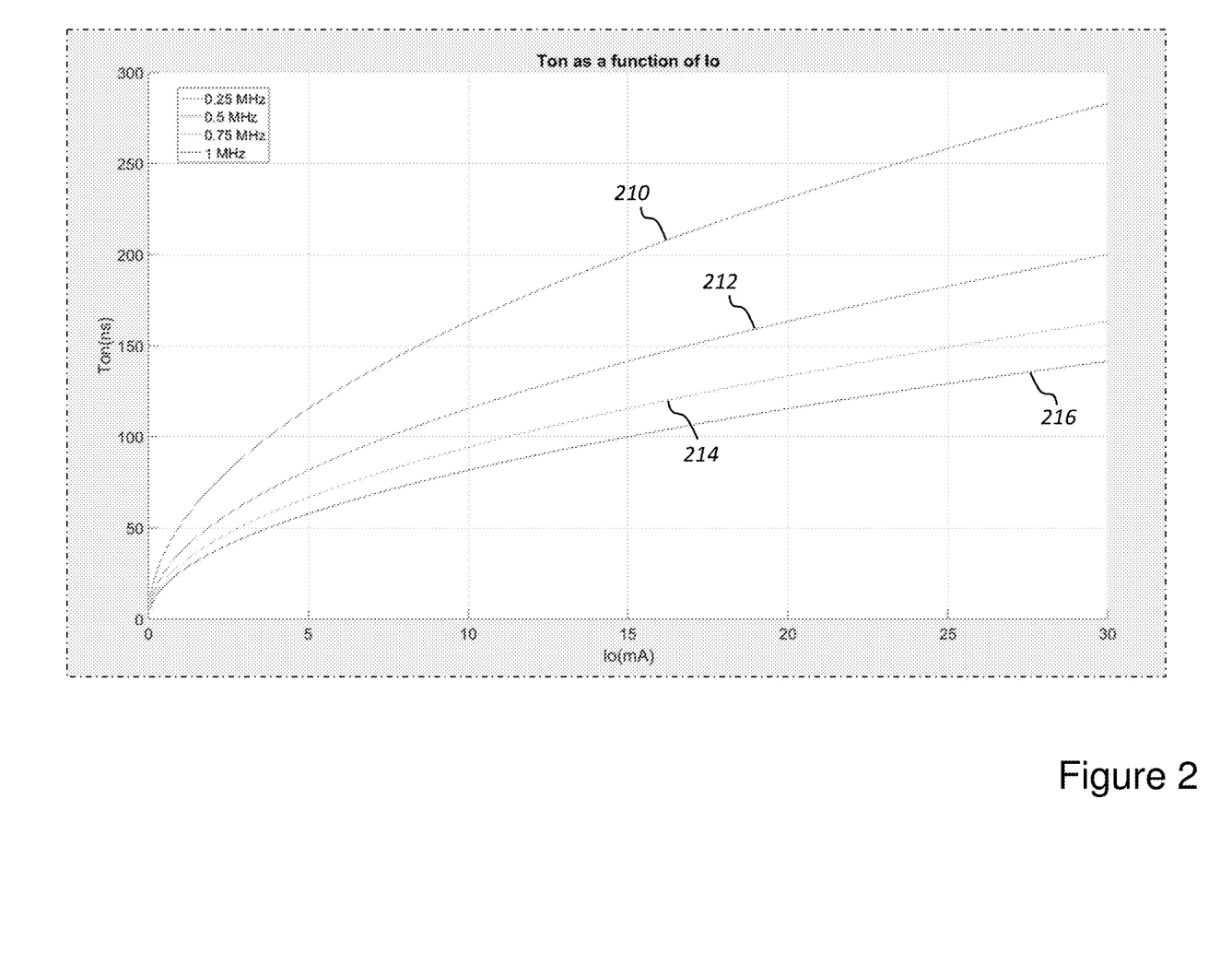
FIG. 2 illustrates the load-dependence of the on-time for a PWM controlled DC-DC converter operating in DCM.

FIG. 2 illustrates the load-dependence of the on-time, $T_{on}$, for a PWM converter. The on-time, $T_{on}$, is plotted versus load current (represented as $I_o$ in the drawing) for four different fixed switching frequencies: 250 kHz 210, 500 kHz 212, 0.75 MHz 214 and 1 MHz 216. In accordance with the above equations, lower switching frequencies correspond to higher on-times.

Figure 3:
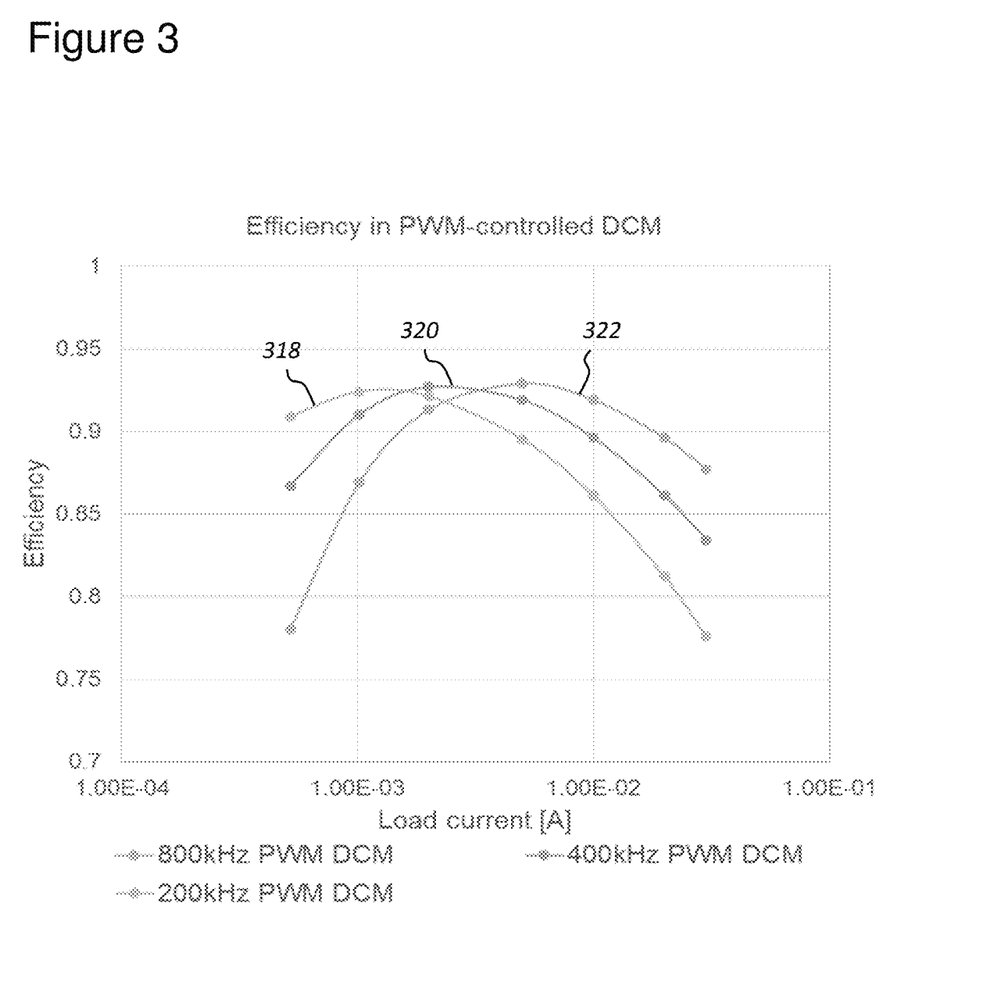
FIG. 3 illustrates operating efficiency as a function of load for a PWM controlled DC-DC converter operating in DCM.

A disadvantage of real PWM converters results from the dependency of the on-time on the load current. Optimal efficiency at the fixed switching frequency can only be achieved for one optimal value of load current (for a given set of boundary conditions: input/output voltage, inductor and power switch size). This effect is illustrated in FIG. 3, in which converter efficiency is plotted versus load current for three different fixed switching frequencies, 200 kHz 318, 400 kHz 320 and 800 kHz 322. For a particular fixed switching frequency, the efficiency peaks at an optimal value of the load current. If the load current is lower than the optimal load current, switching losses dominate and the efficiency drops. If the load current is higher than the optimal load current, the efficiency drops because of dominating conduction losses.

Figure 4A:
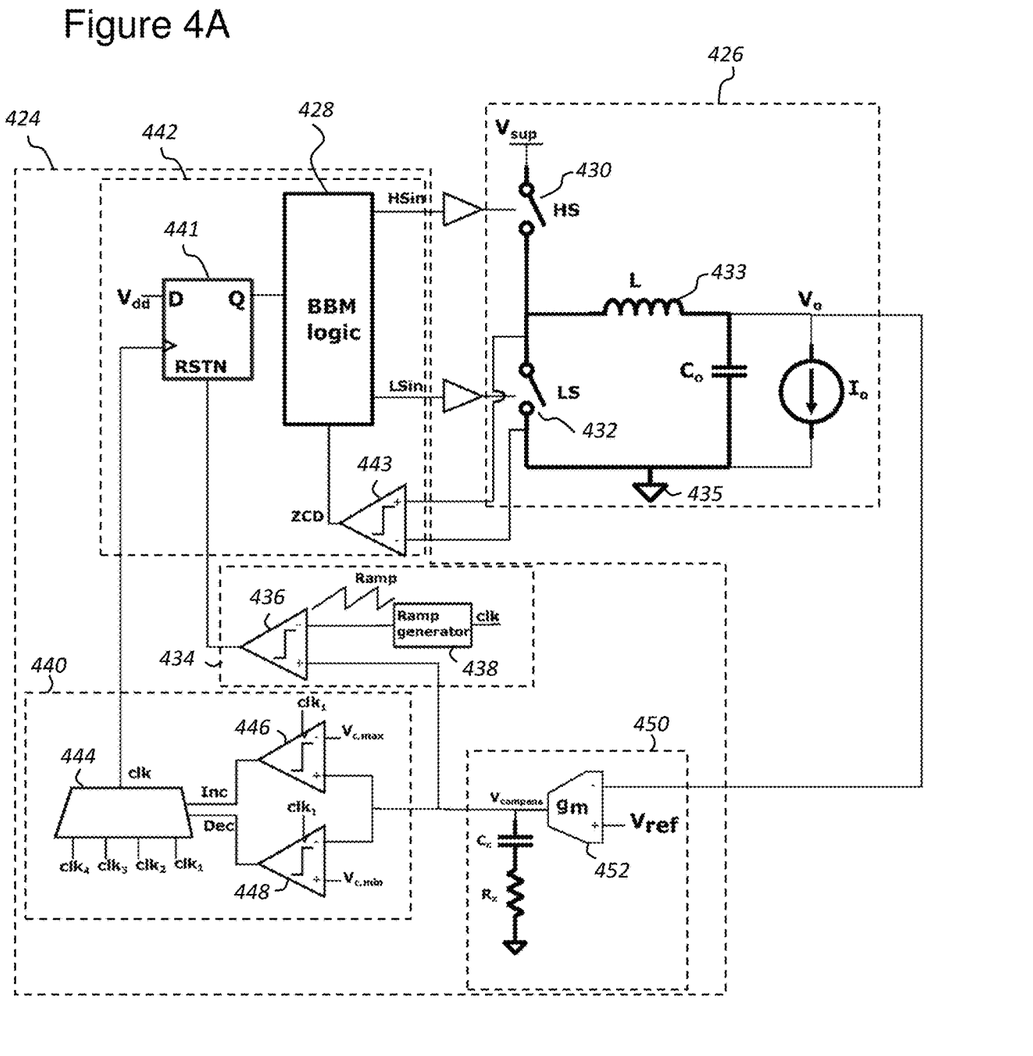
FIG. 4A illustrates a controller for a DC-DC converter according to an embodiment of the present disclosure.

FIG. 4A illustrates a controller 424 for a DC-DC converter 426 according to an embodiment of the present disclosure. The illustrated controller is a DCM controller for a low-power DC-DC converter. Although it will be appreciated that in some examples the controller 424 can also control the DC-DC converter such that it operates in other modes such as continuous conduction mode (CCM) and boundary conduction mode (BCM). As will be discussed further below, the controller 424 can combine a continuous on-time control with a frequency-hopping control. In this way, the controller 424 can combine the advantages of PWM and PFM controllers.

The controller 424 comprises an output module 442, an on-time-control-module 434 and a frequency-control-module 440. The output module 442 provides a switch control signal to the DC-DC converter 426. The on-time-control-module 434 sets an on-time of the switch control signal based on a compensation-signal, $V_{compens}$, representative of an output voltage, $V_o$, of the DC-DC converter. For example, the compensation may correspond to the error in the output voltage, $V_0$, that is a difference between a reference voltage $V_{ref}$ and the output voltage $V_o$. The frequency-control-module 440 regulates the compensation-signal, $V_{compens}$, to a target range by setting a switching-frequency of the switch-control-signal to one of a plurality of pre-defined discrete frequencies. In other words, the frequency-control module 440 sets a switching frequency of the switch control signal to one of the plurality of pre-defined discrete frequencies so that the compensation signal, $V_{compens}$, stays within the target range, which may be defined by lower and upper limits, $V_{c,min}$, $V_{c,max}$.

By regulating the compensation signal to the target range, the frequency-control-module effectively regulates the on-time of the switch control signal (and therefore peak inductor current) to an equivalent target range because the on-time-control-module sets the on-time based on the compensation signal. In this way, the controller 424 regulates the output voltage, $V_o$, by setting the on-time via the on-time-control-module 434 based on the compensation signal. The frequency-control-module 424 further refines or regulates the on-time (by regulating the compensation signal) to within a fixed range by setting the switching frequency to one of a plurality of discrete frequencies. By frequency hopping between the discrete switching frequencies, instead of the continuous change in switching frequency of PFM, the controller 424 can provide a predictable output voltage spectrum. This effect can be further enhanced if each of the plurality of discrete switching frequencies are harmonics of a fundamental frequency. Furthermore, by restricting the on-time/peak inductor current to a target range (by regulating the compensation signal to a target range), instead of the unconstrained variation of on-time/peak current in PWM, the efficiency of the controller can remain high for a wide range of load currents.

In this example, the on-time-control-module 434 and the frequency-control-module 440 both receive the same compensation signal provided by an error module 450. In other examples, the on-time-control-module 434 and the frequency-control-module 440 may receive a respective first compensation signal and separate second compensation signal provided by either the error module 450 or by separate error modules. The first compensation signal and second compensation signals are both representative of the output voltage, $V_0$. Therefore, when the frequency-control-module regulates the second compensation signal to a target range, the first compensation signal is also regulated to an equivalent target range because both compensation signals depend on the output voltage, $V_0$. In the embodiments described herein, it will be understood that compensation signal may equivalently refer to a first or second compensation signal as appropriate.

The output module 442 is configured to provide the switch control signal to the DC-DC converter 426. In this example, the output module 442 comprises a flip-flop 441, a zero-current-detector (ZCD) 443 and break before make (BBM) logic circuitry 428. The switch control signal is a periodic signal having an on-time and a switching frequency. In this example the controller 424 provides the switch control signal as a high-side signal, HSin, and a low-side signal, LSin, to respective high-side and low-side power switches 430, 432 of the DC-DC converter 426. The on-time of the switch control signal defines the on-time of the high-side power switch 430, that is the time the high-side power switch 430 is 'on' or closed during a switching cycle. The switching frequency defines the frequency at which switching cycles occur.

The on-time-control-module 434 receives the compensation signal, $V_{compens}$, from the error module 450. The on-time-control-module 434 sets the on-time of the switch control signal based on the compensation signal, $V_{compens}$. In this example, the on-time-control-module 434 comprises a comparator 436. The comparator 436 can compare the compensation signal, $V_{compens}$, to a reference signal.

In this example, the reference signal is provided by a ramp generator 438. By providing the reference signal in this way, the controller 424 can operate in a voltage mode with on-time control. The ramp generator may receive a clock signal for defining the start of the on-time during a switching cycle. In some examples the ramp generator 438 may receive the clock signal from the frequency-control-module 440. In some examples the on-time-control-module 434 may further comprise an AND gate (not shown) configured to receive the clock signal and a signal from the zero-current detector 443 which detects when an inductor current in the inductor 433 of the DC-DC converter is zero. The AND gate can ensure that a switching cycle/on-time does not begin until the inductor current has fallen to zero (previous switching cycle has ended).

Figure 4B:
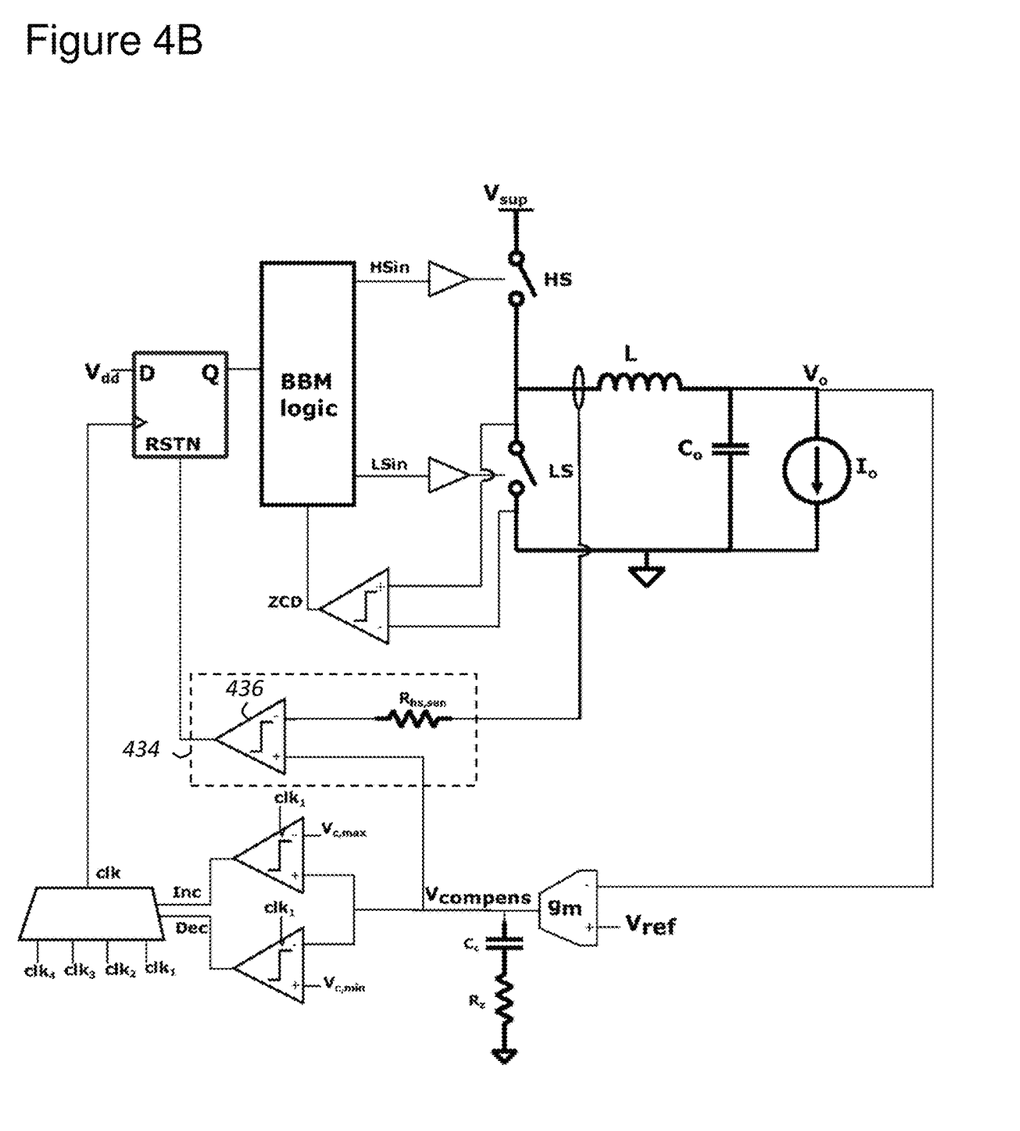
FIG. 4B illustrates a controller for a DC-DC converter operating in current control mode according to a further embodiment of the present disclosure.

FIG. 4B illustrates an alternative embodiment of the controller 424 operating in a current-mode with peak-current control. In this example, the comparator 436 of the on-time-control-module 434 receives a reference signal comprising a signal from a sense circuit which detects the inductor current.

Using an on-time generator (ramp generator 438) in a voltage mode can simplify the design of the controller 424 by avoiding the need for a current-sense circuit. However, in some examples, the controller may use a controlled peak current instead of an on-time and still realise the benefits disclosed herein.

Returning to FIG. 4A, the on-time-control-module 434 may set the on-time of the switch control signal by providing an on-time signal to the output module 442. In this example, the on-time-control-module 434 provides the on-time signal to a reset terminal (RSTN) of the flip-flop 441. The on-time signal may comprise a single pulse that resets the flip-flop 441 to indicate an end of the on-time.

The frequency-control-module 440 also receives the compensation signal, $V_{compens}$, from the error module 450. The frequency-control-module 440 regulates the compensation signal, $V_{compens}$, to the target range by setting the switching frequency of the switch control signal to one of a plurality of pre-defined discrete frequencies based on the compensation signal. In this example, the frequency-control-module 440 comprises a clock-control-module 444. The clock-control-module 444 receives a plurality of clock signals (clk1, clk2, clk3, clk4) with frequencies corresponding to the plurality of discrete switching frequencies.

The clock-control-module 444 of the frequency-control-module 440 can set the switching frequency of the switch control signal to one of the discrete frequencies by providing the corresponding clock signal to the output module 442. In this example, the clock signal is provided to a clock terminal of the flip-flop 441.

In some examples, the plurality of pre-defined discrete switching frequencies may be integer multiples, or harmonics, of a fundamental frequency. For example, the plurality of switching frequencies may comprise a fundamental frequency and one or more frequencies that are integer multiples of the fundamental frequency. In such examples, the controller 424 can control the DC-DC converter 426 with a well-defined frequency spectrum confined to a specific frequency range. As a result, the input current spectrum and output voltage spectrum can advantageously comprise harmonics at known frequencies. Furthermore, any harmonics of the plurality of pre-defined discrete frequencies will overlap with each other thereby reducing the overall frequency spectrum footprint of the input current spectrum and output voltage spectrum. This can be particularly advantageous for use with noise-sensitive loads for which frequencies can be selected outside a sensitive frequency band of the load or inside the band at a fixed location.

The clock-control-module 444 may comprise a plurality of clocks and a clock multiplexer for providing the plurality of clock signals. In other examples, the clock-control-module 444 may comprise a reference clock and a plurality of frequency dividers for providing the plurality of clock signals. In some examples, the plurality of clocks, reference clock and/or plurality of frequency dividers may be located outside the controller 424.

The frequency-control-module 440 can compare the compensation signal to the target range and set the switching frequency accordingly. In examples where the compensation signal is a positive compensation voltage that feeds into an input of the comparator 436 of the on-time-control-module, the frequency-control-module 440 can operate by: (i) increasing the switching frequency if the compensation signal is greater than an upper limit, $V_{c,max}$, of the target range; and (ii) decreasing the switching frequency if the compensation signal is less than a lower limit, $V_{c,min}$, of the target range. In this example, the frequency-control-module 440 comprises a first comparator 446 and a second comparator 448. The first comparator 446 compares the compensation voltage to the upper limit, $V_{c,max}$, and the second comparator 448 compares the compensation voltage to the lower limit, $V_{c,min}$. As will be discussed in more detail below, the upper and lower limits, $V_{c,max}$, $V_{c,min}$ can be set to correspond to an equivalent on-time target range or peak-inductor-current target range.

The frequency-control-module 440 may compare the compensation signal to the target range according to a reference clock signal. For example, the first and second comparators 446, 448 may only compare the compensation signal to the upper and lower limits at an edge of the reference clock signal. The reference clock signal may comprise one of the plurality of clock signals, for example the clock signal at the fundamental frequency.

Operating the frequency-control-module according to a reference clock signal can reduce frequency hopping at an unpredictable moment in time. For example, without clocked operation, the switching frequency may hop in a cyclic manner back and forth between switching frequencies at an unknown repetition rate. This could result in additional side-band harmonics in the frequency band next to the main harmonics caused by the switching frequency itself. This issue could be particularly prevalent when the compensation signal (or equivalently on-time) is close to either limit of the target range.

Operating the comparators 446, 448 of the frequency-control module 440 according to the reference-clock signal at the fundamental frequency can ensure that frequency hopping only occurs at determined times and with a repetition rate that is a fraction of the currently set switching frequency. The other clock signals with higher frequencies can be used instead which can provide a faster response time of the frequency-control-module 440. However, there is a trade-off between response time of the controller 424 and current consumption of the clocked comparators 446, 448.

The frequency-control-module 440 may increase or decrease the switching frequency if the compensation signal is determined to be outside the target range. The frequency-control-module 440 may increment or decrement the switching frequency to the next or adjacent switching frequency in the plurality of pre-defined discrete switching frequencies.

In some examples, the frequency-control-module 440 may determine a deviation of the compensation signal from the target range. For example, the frequency-control-module may determine a difference between the compensation signal and the closest boundary of the target range. In some examples, the frequency-control-module 440 may comprise additional comparators that compare the compensation signal to additional limits or ranges to determine the deviation to a rough approximation. In other examples, the frequency-control-module 440 may comprise error amplifiers in place of the comparators 446, 448 to determine the deviation. The frequency-control-module 440 can then set the switching frequency to the most appropriate one of the plurality of switching frequencies to regulate the compensation signal to the target range, which is not necessarily an adjacent switching frequency.

In some examples, the controller 424 may comprise the error module 450. In other examples, the error module 450 may be located external to the controller 424, for example as part of the DC-DC converter 426, and the controller 424 may be configured to receive the compensation signal. The error module 450 may comprise an error amplifier 452. The error module 450 may compare the output voltage, $V_0$, of the DC-DC converter 426 to a reference voltage, $V_{ref}$, and output the compensation signal, $V_{compens}$, based on the comparison. In this example, the error module 450 comprises an error amplifier 452 in the form of a $G_m$ stage.

Operation of the controller 424 during a switching cycle will now be described with reference to the example of FIG. 4A.

In the example of FIG. 4A, the frequency-control-module 440 provides a clock signal to a clock terminal of the flip-flop 441. A beginning of the on-time may correspond to an edge of the clock signal setting the flip-flop 441. As a result, the BBM circuitry 428 provides the switch control signal to the high-side switch 430 of the power stage of the DC-DC converter 426, which closes (turns on) coupling a supply voltage, $V_{sup}$, to the inductor 433. The inductor current increases (from zero) because the supply voltage is greater than the output voltage ($V_{sup}>V_o$). The frequency-control-module 440 also provides the clock signal to the ramp generator 438 of the on-time-control-module 434 to indicate the start of the on-time and a corresponding voltage ramp.

The $g_m$-stage error amplifier 450 receives or (senses) the output voltage, $V_o$, of the DC-DC converter 426, compares it to the reference voltage, $V_{ref}$, and outputs the compensation signal, $V_{compens}$, accordingly. The comparator 436 of the on-time-control-module 434 compares the compensation signal, $V_{compens}$, with a ramp voltage from the ramp generator 438. After a period of time, the ramp voltage increases to a value greater than the compensation signal, $V_{compens}$, and the on-time-signal output by the comparator 436 resets the flip-flop (RSTN), indicating the end of the on-time.

Following the reset of the flip-flop 441, the BBM circuitry provides the switch control signal to open the high-side switch 430, and close the low-side switch 432 thereby coupling the inductor 433 to a reference terminal 435. The inductor current decreases to zero. As the controller is operating in DCM, the ZCD 443 triggers the BBM circuitry 428 to open the low-side switch 432 when the inductor current drops to zero. Both switches 430, 432 remain open (as illustrated) until the next switching cycle.

The on-time-control-module 434, exemplified here by the ramp generator 438 in combination with the comparator 436, generates the on-time in proportion to the compensation-signal, $V_{compens}$. The frequency-control-module 440 regulates the compensation signal, and consequentially the on-time and resultant peak inductor current, to a target range, by hopping between pre-determined discrete switching frequencies. In this way, undesirably low or high values of on-time and peak current (and the associated efficiency drop illustrated in FIG. 3) can be avoided or reduced, particularly in response to significant changes in the load. In addition, constraining the switching frequency to a plurality of predefined discrete values provides a predetermined output voltage spectrum and avoids the uncontrolled spectrum of PFM control.

In the event of a change in load, for example from a light load to a heavy load, the output voltage, $V_o$, will drop. As a result, the error module 450, comparing the output voltage, to the reference voltage, $V_{ref}$, may respond by increasing the compensation voltage, $V_{compens}$. The on-time-control-module 434 can then increase the on-time in response to the increase in the compensation signal, $V_{compens}$. Due to a longer on-time, the inductor peak current will increase and deliver more energy to the output per switching cycle, thereby regulating the output voltage, $V_o$. Without any further control, this on-time adjustment would be similar to that depicted in FIG. 1B.

To avoid undesirably high or low on-times/peak inductor currents, the frequency-control-module 440 regulates the compensation signal, $V_{compens}$, to a target range. In the examples of FIGS. 4A and 4B, the first and second comparators compare the compensation signal $V_{compens}$, with an equivalent minimum and maximum inductor peak current setting, $V_{c,max}$ and $V_{c,min}$. The two comparators 446, 448 control a clock multiplexer or a clock frequency divider of the clock-control-module 444 and ensure that the switching frequency is increased/decreased when the maximum/minimum on-time or peak current is reached.

For an increasing load and resulting increase in on-time/peak current above the maximum setting, $V_{c,max}$, the frequency-control-module 440 will increase the switching frequency to a higher one of the predetermined discrete switching frequencies. As a result, the inductor peak current will decrease and the controller 424 will find a new equilibrium state.

In the event of a decreasing load and a resulting decrease in on-time/peak current below the minimum setting, $V_{c,min}$, the frequency-control-module 440 will decrease the switching frequency to a lower one of the predetermined discrete switching frequencies. As a result, the inductor peak current will increase and the controller 424 will find a new equilibrium state.

At very light loads, when the switching frequency is equal to the lowest switching frequency of the plurality of discrete switching frequencies, the compensation signal and the corresponding on-time/peak current can fall below the lower limit, $V_{c,min}$, of the target range because the frequency-control-module 440 cannot select a lower clock signal. As a result, the efficiency and on-time of the controller 424 can reduce to undesirable levels. To reduce this effect, the controller 424 can operate the converter in PFM mode at light loads. That is, in some examples, the controller can combine the plurality of discrete switching frequency PWM control with a PFM mode at very light loads or no load.

Figure 4C:
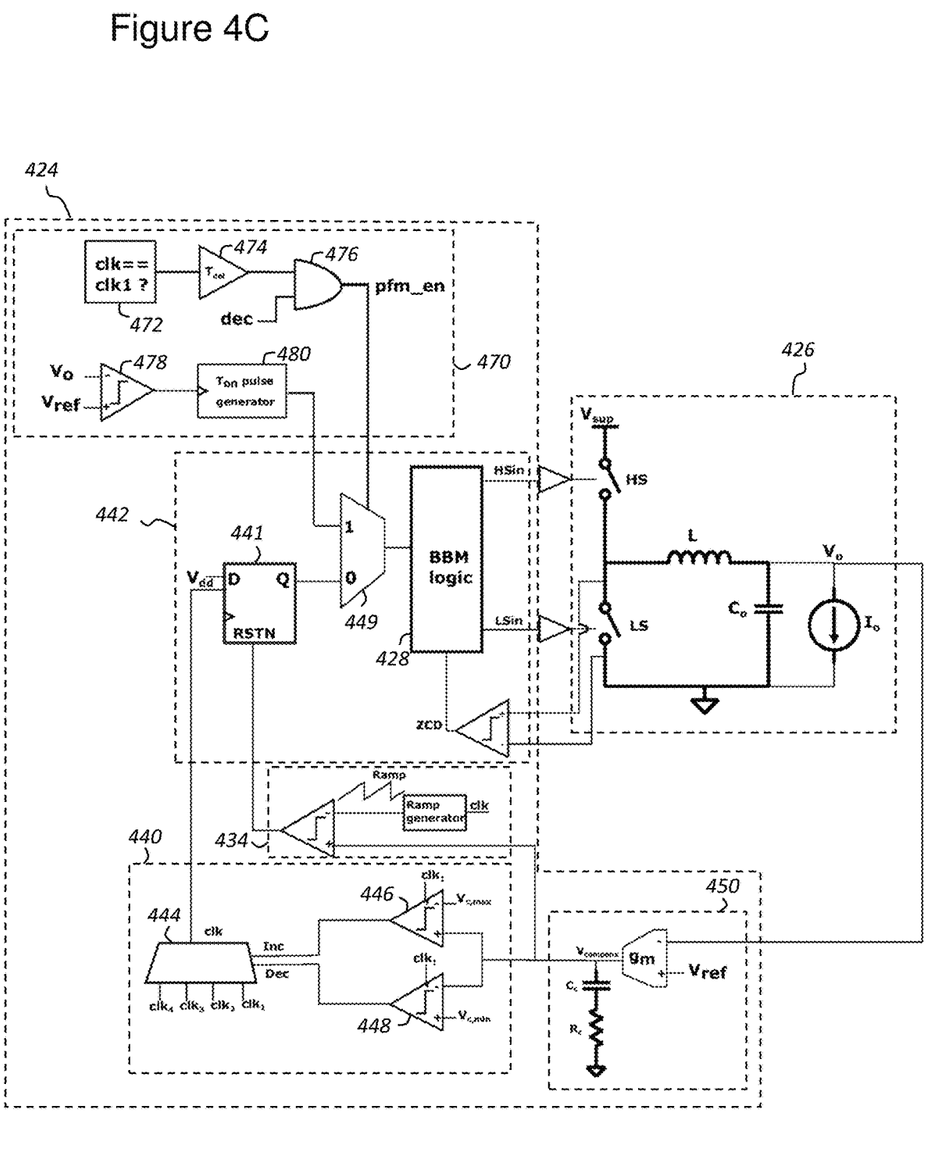
FIG. 4C illustrates a controller for a DC-DC converter with a light-load PFM mode according to a further embodiment of the present disclosure.

FIG. 4C illustrates a controller for a DC-DC converter with additional control for low loads according to an embodiment of the present disclosure. The embodiment is an extension of the controller of FIG. 4A and corresponding features have been given the same reference number and will not necessarily be described again here.

In this example, the controller 426 operates in a PFM mode if the compensation signal, $V_{compens}$, is less than the lower limit of the target range and the switching frequency is the lowest switching frequency of the plurality of pre-defined discrete switching frequencies.

In this example, the controller further comprises a PFM-control-module 470 configured to set the controller into PFM mode (at very low loads). The PFM module 470 comprises a clock check module 472 which provides a clock check signal indicative of whether the current clock signal, clk, (or switching frequency) is equal to the clock signal corresponding to the lowest switching frequency, clk1. A delay element 474 receives and delays the clock check signal by a delay time, $T_{del}$. The delay time, $T_{del}$, may comprise multiple periods of the clock signal clk1. The PFM module further comprises an AND gate 476. The AND gate 476 receives the delayed clock check signal as a first input. The AND gate also receives a comparator output signal, Dec, from the lower limit comparator 448 of the frequency-control-module 440 as a second input. The AND gate 476 outputs a PFM enable signal, pfm_en, to the output module 442. The PFM enable signal, pfm_en, is high if the delayed clock signal and the comparator output signal, Dec, are both high.

In this example, the PFM-control-module 470 further comprises a low-voltage comparator 478 and a fixed on-time pulse generator 480. The low-voltage comparator 478 is configured to trigger the fixed on-time pulse generator 480 to produce a switching pulse, with a fixed pre-defined on-time, if the output voltage, $V_O$, falls below the reference voltage $V_{ref}$. The fixed on-time pulse generator 480 provides the switching pulse to the output module via a PFM on-time signal.

In this example, the output module 442 further comprises a multiplexer 449 arranged between the flip flop 441 and the BBM circuitry 428. The multiplexer 449 receives an output from the flip flop 441 and the PFM on-time signal from the PFM-control-module 470 as inputs. The multiplexer 449 selects one of the two inputs and provides the selected input to the BBM circuitry 428 based on the state of the PFM enable signal, pfm_en, received from the PFM-control-module 470.

In operation, PFM mode is enabled, with the PFM enable signal, pfm_en, set to 1, if the clock signal, clk, corresponds to the lowest switching-frequency of the plurality of discrete switching frequencies and the comparator output signal, Dec, is still asserted after the pre-defined delay time, $T_{del}$. The delay time, $T_{del}$, can be multiple periods of the clock signal, $clk_1$. The delay time, $T_{del}$, delay can provide sufficient time for the main control loop to settle. When operating in PFM mode, if the output voltage, $V_o$ drops below the reference voltage, $V_{ref}$, the low-voltage comparator 478 triggers the fixed on-time pulse generator 480. The fixed on-time pulse generator produces a switching pulse of pre-defined pulse width. In this way, a switching pulse is produced 'on-demand' rather than at a fixed switching frequency. The switching pulse is supplied as the PFM on-time signal to the BBM 429 via the multiplexer 449 when the PFM enable signal, pfm_en, is high. If the load current increases while in PFM mode, the comparator output signal, Dec, deasserts, and the controller 424 immediately reverts to the normal control mode (as described with reference to FIG. 4A).

In other examples, the controller of FIG. 4A or 4B may implement a different scheme to that of FIG. 4C if the compensation signal (or equivalently on-time/peak current) is less than the lower limit of the target range and the switching frequency of the switch control signal is equal to the lowest switching frequency of the plurality of pre-defined discrete switching frequencies. For example, the controller 424 may implement pulse skipping in which the switch control signal is provided such that it causes the high-side power switch 430 to close for only some pulses (for example every other pulse) of the clock signal (and not to close for the intervening pulses in the clock signal).

The proposed controller 424 regulates: (i) the on-time (switching pulse width); and (ii) the DC-DC converter 426 switching frequency, to regulate the output voltage, $V_o$. The switching frequency is controlled such that it can hop between pre-defined switching frequencies. The proposed controller 424 makes use of the dependency between switching frequency and converter on-time to regulate the output voltage, $V_o$.

Figure 5:
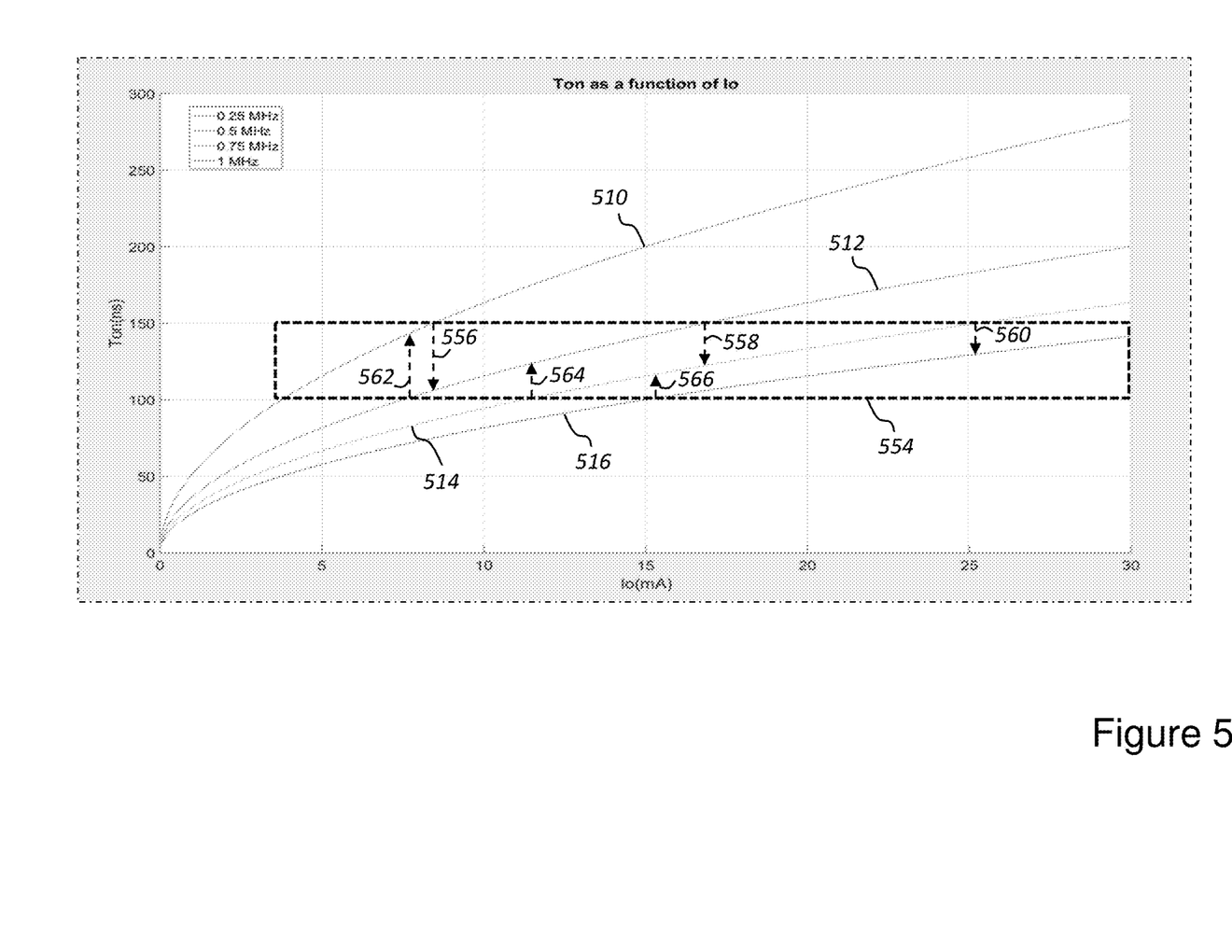
FIG. 5 illustrates the dependency of the on-time on switching frequency for a controller according to an embodiment of the present disclosure.

FIG. 5 illustrates the dependency of the on-time on switching frequency for a controller according to an embodiment of the present disclosure. The same four curves from FIG. 2 are plotted for reference, corresponding to the four different fixed switching frequencies: 250 kHz 510, 500 kHz 512, 0.75 MHz 514 and 1 MHz 516. However, in this case, the limited operating region (target range 554) of the on-time of the DC-DC converter is indicated. The target range 554 is defined between a minimum and maximum on-time of 100 ns to 150 ns in this example.

If the on-time exceeds the maximum on-time of 150 ns, the frequency-control-module of the controller will set the switching frequency to a higher one of the plurality of predefined discrete switching frequencies. Similarly, if the on-time drops below a minimum value of 100 ns the switching frequency is lowered. Increasing and decreasing of the switching frequency happens in the distinctive steps of the predefined plurality of discrete switching frequencies (in this example 250 kHz, 500 kHz, 0.75 MHz, 1 MHz). The load range that can be covered in this example is from 3 mA to 30 mA.

The Figure illustrates a series of frequency-increase transitions 556, 558, 560 between the four switching frequencies 510, 512, 514, 516. These frequency-increase transitions 556, 558, 560 occur when the on-time exceeds the maximum on-time. Similarly, a series of frequency-decrease transitions 562, 564, 566 are depicted between the four switching frequencies 510, 512, 514, 516. These frequency-decrease transitions 556, 558, 560 occur when the on-time falls below the minimum on-time. The Figure illustrates that each frequency-increase transition and its corresponding frequency-decrease transition between the same switching frequencies should occur at different load conditions. This hysteresis can increase stability and reduce the likelihood of the switching frequency jumping back and forth between adjacent frequencies. The Figure illustrates immediate switching frequency transitions when the on-time, corresponding to a particular switching frequency, crosses the maximum or minimum values. In reality, for large changes in load, the on-time may over-shoot or under-shoot the maximum or minimum on-time due to the finite speed of the control loops. However, the frequency-control-module increases/decreases the switching frequency to return the on-time to the target range 554 and any over-shoot or under-shoot will be considerably smaller than the variation in on-time that would be required by a fixed-frequency PFM controller for such large changes in load.

Advantages of the proposed controller may include:
- The on-time of the DC-DC converter can vary continuously (within the target range) to regulate the output voltage.
- Due to frequency hopping, the overall efficiency can remain high over a wide range of loads. The DC-DC converter can operate around the maximum efficiency point for each of the plurality of discrete switching frequencies.
- By operating at a discrete set of switching frequencies, the controller can maintain a well-defined frequency spectrum.
- It is not essential to sense either the load current or the inductor peak current. Instead, the compensation signal provided by the analog-loop output-voltage error amplifier can be used to control the frequency-control-module.

The controller may still be considered as a PWM controller operating in DCM, which is a first-order system which can result in a stable system.

Due to the lower on-time limit, extremely short on-times of the power transistors can be avoided.

In summary, the disclosed controller and DC-DC converter combine the high efficiency over a wide load range of PFM with the predictable output voltage spectrum of PWM. This is achieved by restricting the on-time variation to a limited range and the frequency variation to a plurality of predefined discrete switching frequencies.

The disclosed controller may be used in many applications, particularly those that require a low-power DC-DC converter operating in DCM and supplying noise-sensitive loads. The controller can be applied to all common types of DC-DC converters such as buck, boost and buck-boost converters.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A controller for controlling a DC-DC converter in a discontinuous conduction mode (DCM) the controller comprising:
    an output module configured to provide a switch control signal to the DC-DC converter, the switch control signal having an on-time and a switching frequency which are continuously set, respectively, by a continuous on-time control signal and frequency-hopping control signal;
    an on-time-control-module configured to:
        receive a first compensation signal, wherein the first compensation signal is based on the output voltage of the DC-DC converter; and
        generate the continuous on-time control signal which continuously sets the on-time of the switch control signal based on the first compensation signal; and
    a frequency-control-module configured to:
        receive the first compensation signal and a reference clock signal, and
        regulate the first compensation signal to a target range to generate a frequency-hopping control signal which continuously sets the switching frequency of the switch control signal to one of a plurality of pre-defined discrete switching frequencies based on the first compensation signal, wherein the regulating includes comparing the first compensation signal to the target range at an edge of a reference clock signal.

2. The controller of claim 1, wherein the plurality of pre-defined discrete switching frequencies comprises:
    a fundamental frequency; and
    one or more frequencies that are integer multiples of the fundamental frequency.

3. The controller of claim 2, wherein the frequency-control-module is configured to regulate the first compensation signal by:
    increasing the switching frequency if the first compensation signal is greater than an upper limit of the target range; and
    decreasing the switching frequency if the first compensation signal is less than a lower limit of the target range.

4. The controller of claim 1, wherein:
    the frequency-control-module is configured to regulate the first compensation signal by:
        increasing the switching frequency if the first compensation signal is greater than an upper limit of the target range; and
        decreasing the switching frequency if the first compensation signal is less than a lower limit of the target range.

5. The controller of claim 1, wherein the frequency-control-module is configured to increment or decrement the switching frequency to an adjacent one of the plurality of pre-defined discrete switching frequencies if the first compensation signal is outside the target range.

6. The controller of claim 1, wherein the frequency-control-module is configured to:
   determine a deviation of the first compensation signal from the target range; and
   set the switching frequency to one of the plurality of pre-defined discrete switching frequencies based on the deviation.

7. The controller of claim 1, wherein the first compensation signal is based on a comparison of the output voltage of the DC-DC converter to a reference voltage.

8. The controller of claim 1, further comprising an error module configured to provide the first compensation signal.

9. The controller of claim 1, wherein the frequency-control-module is configured to:
   receive a plurality of clock signals, each clock signal having a frequency equal to one of the plurality of pre-defined discrete switching frequencies; and
   set the switching frequency of the switch control signal to one of the plurality of pre-defined discrete switching frequencies by outputting the corresponding clock signal as the frequency-hopping control signal.

10. The controller of claim 9, further comprising a plurality of reference clocks configured to provide the plurality of clock signals.

11. The controller of claim 9, further comprising a reference clock and a plurality of frequency dividers configured to provide the plurality of clock signals.

12. The controller of claim 1, wherein the reference clock signal corresponds to the lowest switching frequency of the plurality of predefined discrete switching frequencies.

13. The controller of claim 1, wherein:
   the on-time-control module comprises a ramp generator; and
   the on-time-control module is configured to:
      compare a ramp voltage from the ramp generator to the first compensation signal; and
      set the on-time of the switch control signal based on the comparison.

14. The controller of claim 1, wherein the controller is configured to operate in a pulse-frequency modulation mode if the first compensation signal is less than a lower limit of the target range and the switching frequency of the switch control signal is equal to the lowest switching frequency of the plurality of pre-defined discrete switching frequencies.

15. A DC-DC converter comprising the controller of claim 1.

16. The controller of claim 1, wherein:
   the reference clock signal has a reference frequency which comprises the lowest switching frequency of the plurality of pre-defined discrete switching frequencies.

17. The controller of claim 1, wherein the on-time-control module is configured to:
   compare a current of the DC-DC converter to the first compensation voltage; and
   set the on-time of the switch control signal based on the comparison.

18. The controller of claim 1, wherein the controller is configured to operate DC-DC converter in discontinuous conduction mode.

* * * * *